United States Patent
Merry et al.

(10) Patent No.: US 9,296,105 B2
(45) Date of Patent: Mar. 29, 2016

(54) VIBRATION-CONTROLLED SUBSTRATE HANDLING ROBOTS, SYSTEMS, AND METHODS

(71) Applicant: Applied Materials, Inc., Santa Clara, CA (US)

(72) Inventors: Nir Merry, Mountain View, CA (US); Alex Minkovich, Campbell, CA (US); Jeffrey C. Hudgens, San Francisco, CA (US); Brendan Till, Emeryville, CA (US)

(73) Assignee: Applied Materials Inc., Santa Clara, CA (US)

( * ) Notice: Subject to any disclaimer, the term of this patent is extended or adjusted under 35 U.S.C. 154(b) by 27 days.

(21) Appl. No.: 14/085,462

(22) Filed: Nov. 20, 2013

(65) Prior Publication Data

US 2014/0156070 A1    Jun. 5, 2014

Related U.S. Application Data

(60) Provisional application No. 61/731,816, filed on Nov. 30, 2012.

(51) Int. Cl.
*B25J 9/00* (2006.01)
*B25J 9/16* (2006.01)

(52) U.S. Cl.
CPC .................................... *B25J 9/1653* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,699,145 A | * | 12/1997 | Makinouchi | G03F 7/70358 250/206 |
| 7,861,593 B2 | * | 1/2011 | Bougaev | G01H 1/00 73/593 |
| 8,318,094 B1 | * | 11/2012 | Bayandorian | G01N 21/645 422/400 |
| 8,983,660 B1 | * | 3/2015 | Hanfling | B25J 11/0095 700/254 |
| 2003/0117596 A1 | * | 6/2003 | Nishi | G03F 7/70766 355/72 |
| 2003/0147062 A1 | * | 8/2003 | Morisada | G03F 7/709 355/72 |
| 2004/0013499 A1 | * | 1/2004 | Cho | H01L 21/67259 414/217 |
| 2004/0253794 A1 | * | 12/2004 | Faris | B81C 1/00238 438/459 |
| 2006/0222480 A1 | * | 10/2006 | Duhamel | H01L 21/67276 414/744.8 |
| 2007/0001638 A1 | * | 1/2007 | Gray | B25J 9/1692 318/568.11 |

(Continued)

OTHER PUBLICATIONS

International Search Report and Written Opinion of International Application No. PCT/US2013/071037 mailed Feb. 24, 2014.

(Continued)

*Primary Examiner* — Jonathan L Sample
(74) *Attorney, Agent, or Firm* — Dugan & Dugan, PC

(57) ABSTRACT

Embodiments disclose a vibration-controlled robot apparatus. The apparatus includes a robot having an end effector operable to transport a substrate, a sensor coupled to the robot, the sensor operable to sense vibration as the robot transports the substrate, and operating the robot to reduce vibration of the end effector supporting the substrate. In some embodiments, a filter is provided in the motor drive circuit to filter one or more frequencies causing unwanted vibration of the end effector. Vibration control systems and methods of operating the same are provided, as are other aspects.

19 Claims, 6 Drawing Sheets

(56) References Cited

U.S. PATENT DOCUMENTS

| | | | |
|---|---|---|---|
| 2007/0067678 A1* | 3/2007 | Hosek | G05B 23/0235 714/25 |
| 2007/0097340 A1* | 5/2007 | Yuan | F16F 7/1005 355/53 |
| 2007/0248439 A1 | 10/2007 | Asari et al. | |
| 2007/0286711 A1* | 12/2007 | Hashimoto | H01L 21/67766 414/217 |
| 2008/0042608 A1* | 2/2008 | Nelson | H01L 21/67253 318/568.21 |
| 2008/0114473 A1* | 5/2008 | Heiland | G03F 7/70525 700/44 |
| 2008/0228430 A1* | 9/2008 | Bonciolini | G01P 15/18 702/141 |
| 2010/0129940 A1* | 5/2010 | Little | H01L 21/67742 438/14 |
| 2010/0157274 A1* | 6/2010 | Shibazaki | G03F 7/70341 355/72 |
| 2010/0178147 A1* | 7/2010 | Kremerman | B25J 9/042 414/744.5 |
| 2010/0188647 A1* | 7/2010 | Yang | G03F 7/70725 355/72 |
| 2010/0222898 A1* | 9/2010 | Yang | G05B 13/04 700/29 |
| 2011/0004343 A1* | 1/2011 | Iida | B25J 9/1638 700/253 |
| 2012/0045723 A1* | 2/2012 | Nawata | F16F 15/002 430/325 |
| 2012/0065902 A1* | 3/2012 | Nakajima | B25J 13/085 702/41 |
| 2013/0047746 A1* | 2/2013 | Nakamura | G01L 9/0019 73/862.59 |
| 2013/0064637 A1* | 3/2013 | Hosek | H01L 21/67742 414/800 |

OTHER PUBLICATIONS

International Preliminary Report on Patentability of International Application No. PCT/US2013/071037 mailed Jun. 11, 2015.

* cited by examiner

VIBRATION-CONTROLLED SUBSTRATE HANDLING ROBOTS, SYSTEMS, AND METHODS

RELATED APPLICATIONS

The present application claims priority from U.S. Provisional Patent Application Ser. No. 61/731,816, filed Nov. 30, 2012, entitled "VIBRATION-CONTROLLED SUBSTRATE HANDLING ROBOT, SYSTEMS, AND METHODS" which is hereby incorporated herein by reference in its entirety for all purposes.

FIELD

The present invention relates generally to substrate handling systems, and more particularly to substrate handling robots, and methods of operating the same.

BACKGROUND

Conventional electronic device manufacturing systems may include multiple process chambers and one or more load lock chambers. Such chambers may be included in cluster tools where a plurality of process chambers may be distributed about a transfer chamber, for example. These systems and tools may employ transfer robots that may be housed within the transfer chamber to transport substrates (e.g., patterned or unpatterned semiconductor wafers, glass panels, polymer substrates, reticules, masks, glass plates or the like) between the various process chambers and one or more load lock chambers.

For example, the transfer robot may transport a substrate from process chamber to process chamber, from load lock chamber to process chamber, or vice versa. When the transfer robot handles the substrate, particles may be created due to the substrate sliding on components of the transfer robot, for example. The substrate sliding may be induced by horizontal substrate acceleration during normal path movements carried out during substrate transport. The transport may be on an end effector of the transfer robot and substrate sliding on the end effector may generate particles. Particle generation is generally undesirable as it may contaminate the manufacturing environment and possibly negatively affect the manufactured substrate.

Accordingly, there is a need for a substrate handling robot that enables rapid movement of substrates with reduced particle generation.

SUMMARY

In a first aspect, a vibration-controlled robot apparatus is provided. The vibration-controlled robot apparatus includes a robot having an end effector operable to transport a substrate, a sensor coupled to the robot, the sensor operable to sense vibration as the robot transports the substrate, and a filter operable to reduce vibration of the robot.

According to another aspect, a robot vibration reduction method is provided. The robot vibration reduction method includes supporting a substrate with an end effector of a robot, providing a sensor coupled to the robot, detecting a vibration of the robot with the sensor as the robot transports the substrate, determining one or more conditions under which an undesirable amount of vibration occurs, and minimizing at least some of the vibration of the end effector of the robot.

In yet another aspect, a vibration-controlled substrate transport system is provided. The vibration-controlled substrate transport system includes a chamber, a robot received in the chamber, the robot having an end effector operable to transport a substrate, and a sensor coupled to the robot, the sensor operable to detect a vibration of the robot as the robot supports the substrate.

Numerous other aspects are provided in accordance with these and other embodiments of the invention. Other features and aspects of embodiments of the present invention will become more fully apparent from the following detailed description, the appended claims, and the accompanying drawings.

DESCRIPTION

Figure 1:
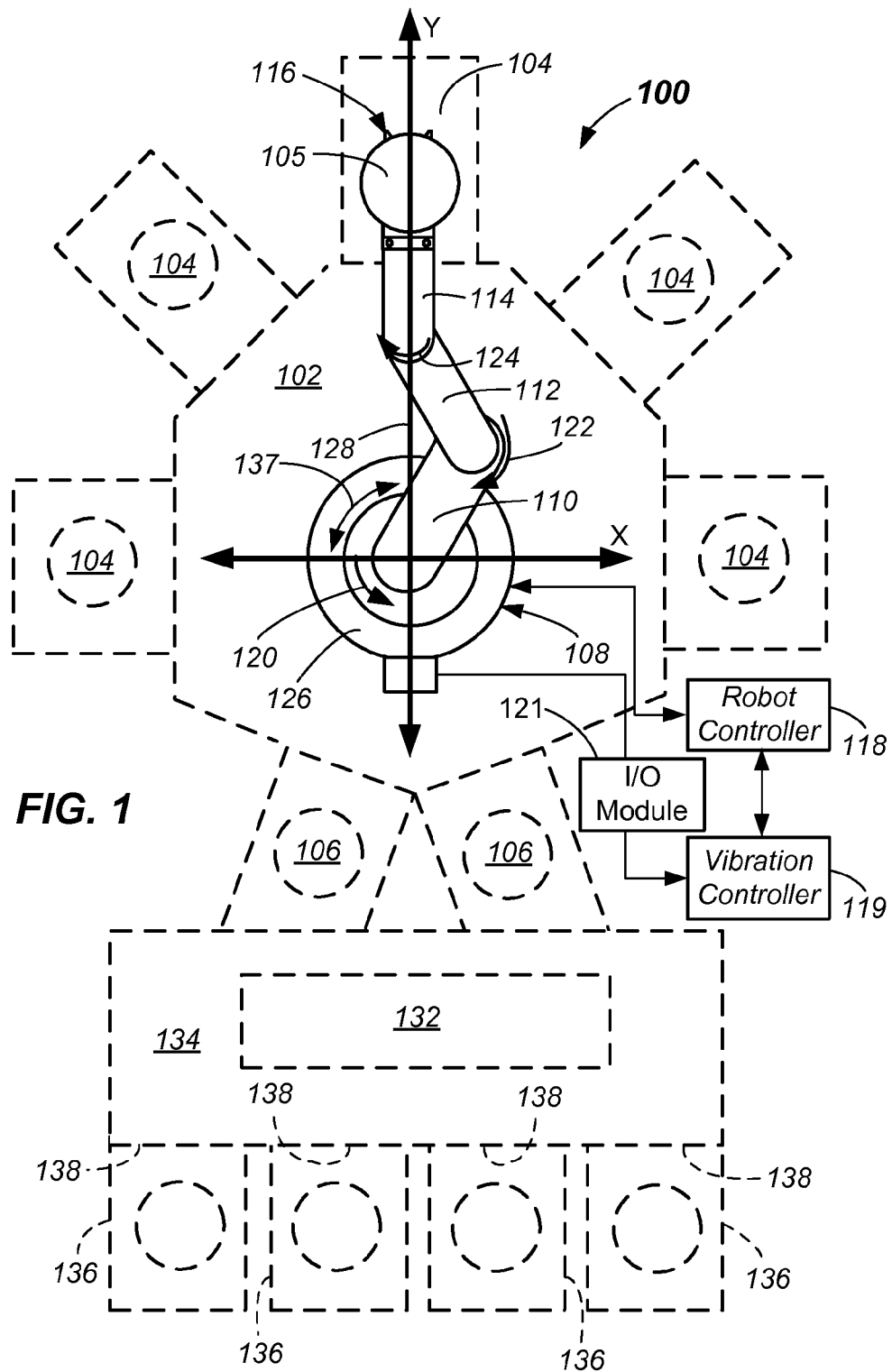
FIG. 1 illustrates a top schematic view of a vibration-controlled substrate transport system according to embodiments.

Electronic device manufacturing may involve very precise and rapid transport of substrates between various locations. In particular, it is desirable that such robots be able to be oriented precisely relative to chambers that they service (e.g., process chambers or one or more load lock chambers). One or more end effectors (sometimes referred to as "blades") may be attached at an end part of an arm of the robot and may be adapted to transport one or more substrates resting upon the end effector(s) to and from the process chambers and/or one or more load lock chambers of a substrate processing system. It is desirable to move the substrate as rapidly as possible, yet minimize sliding and particle generation.

However, in some instances, substrate sliding on the end effector, and, in particular, on end effector pads thereof, may take place. Such substrate sliding may be induced by substrate horizontal (e.g., lateral) acceleration through carrying out normal transfer motion profiles, but also in combination with transfer robot vibration. Vertical vibration imparted to the substrate due to robot motions or other sources reduces the normal force acting on the substrate and thus reduces the friction force thereon. Thus, sliding may occur which may cause particle generation. Accordingly, particle generation is generally undesirable as it may contaminate the substrate, the one or more load lock chambers, process chambers, and transfer chambers and may negatively affect the manufactured substrate, as well as the manufacturing environment. Therefore, there is a need for a substrate handling robot with improved (i.e., reduced) particle generation, and/or the ability to move even faster.

In particular, it is a goal to move a substrate around the manufacturing system while minimizing any evidence of that movement (e.g., particles) and/or any repositioning on the end effector carrying the substrate. Rapid movement of the robot apparatus may cause unwanted vibration of the end effector and the substrate resting thereon. Such vibration may induce sliding and abrasion between the end effector contact pads and the substrate. For example, the inventors have determined that normal operational motion (e.g., lateral acceleration) of the arms and end effectors of the robot apparatus may cause vibration of the robot apparatus as a whole. The motion may excite vibrational modes of the robot apparatus, and therefore cause vibration of the substrate resting on the end effector pads. Some of that vibration may be vertical at the end effector, this reducing the normal force acting on the substrate. Other sources of robot vibration include internal tool stimulators such as motors, transmission drive systems, pumps, slit valves, other robots, as well as external stimulation and sub-optimal servo control. Sub-optimal servo control, as used herein, means the initial control algorithms used to operate the robot are less than optimal as applied in the field.

For example, settings for the robot apparatus may come from an understanding of the dynamic behavior of the system in a known environment and with factory settings. However, once in the field, and operating as part of an actual system, the settings may need to change due to environmental factors such as temperature changes, belts loosening, installation variances, etc., so that the robot's movements may again be optimized. As described above, the robot vibration, in combination with substrate vertical acceleration and movement during carrying out normal motion profiles, may cause the substrate to slip or slide on the end effector pads. In one aspect, any movement of the substrate on the end effector pads is problematic in that it is desirable to place a substrate reliably in a certain position in the process chamber or load lock chamber, and if the substrate's position has moved from a desired location on the end effector, the substrate may not be accurately placed thereafter.

Additionally, the substrate acceleration and sliding may create unwanted generation of particles. Particle generation is undesirable as described above. Conventional robot apparatus may use position feedback, such as in substrate center-finding systems, to sense motion (e.g., repositioning due to sliding) of a substrate on the end effector. However, such position feedback does not provide any indication of vibration or address particle generation.

Embodiments of the present invention provide apparatus, systems, and methods for reducing vibration of a robot. In particular, embodiments of the present invention provide a vibration-controlled robot apparatus to reduce vibration of the robot, and therefore reduce vibration of the substrate positioned thereon. This may reduce substrate slippage and thus reduce particle generation, i.e., the production of particles due to abrasion. The improved vibration-controlled robot apparatus is operable to reduce vibration at the substrate by adjusting one or more aspects of the robot motion creating the vibration. In particular, the vibration-controlled robot apparatus may be operable in a way such that it does not operate at a particular frequency or frequencies causing the undesirable vibration, or at least operated in a manner where such vibration is reduced.

These and other embodiments of vibration-controlled robot apparatus, vibration-controlled substrate transport systems, and methods of reducing robot vibration are described below with reference to FIGS. 1-5. The drawings are not necessarily drawn to scale. Like reference numerals are used throughout the specification to denote like elements.

Referring now in specific detail to FIGS. 1-4B, a substrate transport system 100 which may be used for transporting substrates (patterned or unpatterned semiconductor wafers, glass panels, polymer substrates, reticules, masks, glass plates or the like) between various chambers in electronic device manufacturing according to embodiments of the present invention is shown. The substrate transport system 100 may include a vacuum transfer chamber 102 whose boundary walls are shown dotted and one or more process chambers 104 and/or one or more load lock chambers 106 coupled to the transfer chamber 102 (each also shown dotted). Various processes may take place on one or more substrates (e.g., substrate 105) within the various process chambers 104, such as deposition, oxidation, nitration, etching, polishing, cleaning, lithography, or the like. Other processes may be carried out therein.

A robot 108, such as a conventional SCARA ("Selective Compliance Assembly Robot Arm") robot, may be used to transport a substrate 105 between respective chambers 104, 106 (e.g., process chamber to process chamber, process chamber to load lock chamber, or vice versa). A robot 108 may include an upper arm 110 rotatable about a shoulder axis (shown at the intersection of the X and Y axes), a forearm 112 rotatable about an elbow axis on an outboard end of the upper arm 110, and a wrist member 114 rotatable about a wrist member axis at an outboard end of the forearm 112. An end effector 116 may be attached to the wrist member 114 by any suitable means such as bolts, screws, or other mechanical fasteners or the like.

For example, to extend and retract the end effector 116 to and from a process chamber 104, a robot controller 118, which controls operation of the robot 108, may cause the upper arm 110 to rotate about a shoulder axis as shown by arrow 120 within an X-Y plane as defined by the X axis and Y axis shown in FIG. 1. The rotation may be clockwise (for retraction) or counterclockwise (for extension) through an angle of up to about a +/−180 degree excursion, for example. With a conventional SCARA robot, the forearm 112 may be adapted to rotate in a direction as shown by arrow 122 in retraction, and in an opposite direction in extension. With conventional gearing, rotation of the forearm 112 may cause the wrist member 114 to rotate relative to the forearm 112 as shown by arrow 124 in retraction, and in the opposite direction in extension. When a conventional SCARA robot is used as the robot 108, the end effector 116 may translate relative to a robot base 126 along a translation axis 128 connecting the shoulder axis of the upper arm 110 and the wrist axis of the wrist member 114, wherein the translation axis 128 in this embodiment coincides with the Y axis in the orientations shown. Accordingly, pure translation of the end effector 116, with no rotation, when accomplishing extension and retraction motions may be provided. Furthermore, the substrate 105 may be moved from one process chamber 104 to another process chamber 104 or from process chamber 104 to a load lock chamber 106 or from load lock chamber 106 to process chamber 104 by the action of the robot 108 rotating the assembly of arms 110, 112, and wrist member 114 along arrow 137. Although a SCARA robot is shown, it should be understood that the present invention is applicable to other types of robots. Moreover, the present invention may be applicable to robots having more than one attached end effector.

In more detail, each of the process chambers 104 and load lock chambers 106 may be serviced by the robot 108 whereby substrate 105 may be picked from and put to the various chambers 104, 106. As should be recognized, each process chamber 104 may include a substrate (like substrate 105), and the robot 108 may continuously be carrying out pick and place operations to move the substrates 105 between the various chambers 104, 106 to carry out processing thereon.

In more detail, the end effector 116 is retracted from one chamber (e.g., 104) with a substrate 105 resting on the end effector 116. Once retracted, the entire robot 108 may be rotated about the base 126 along arrow 137. Thereafter, the robot upper arm 110, forearm 112, wrist 114 may be actuated to deliver the end effector 116 and substrate 105 residing thereon to another chamber (e.g., 104 or 106). In carrying out such motion profiles, the end effector 116 and the substrate 105 resting therein are subject to vibration which may cause sliding and particle generation.

Broadly, substrates (like substrate 105) may be transferred to the load lock chambers 106 by another robot represented generically as dotted box 132, which may be resident in a chamber of a factory interface 134. The transfer of the substrates within the factory interface 134 may be from substrate carriers 136 docked at load ports 138, for example. Possible locations for substrates in the substrate carriers 136, load locks 106, and process chambers 104 are shown as dotted circles.

Figure 2:
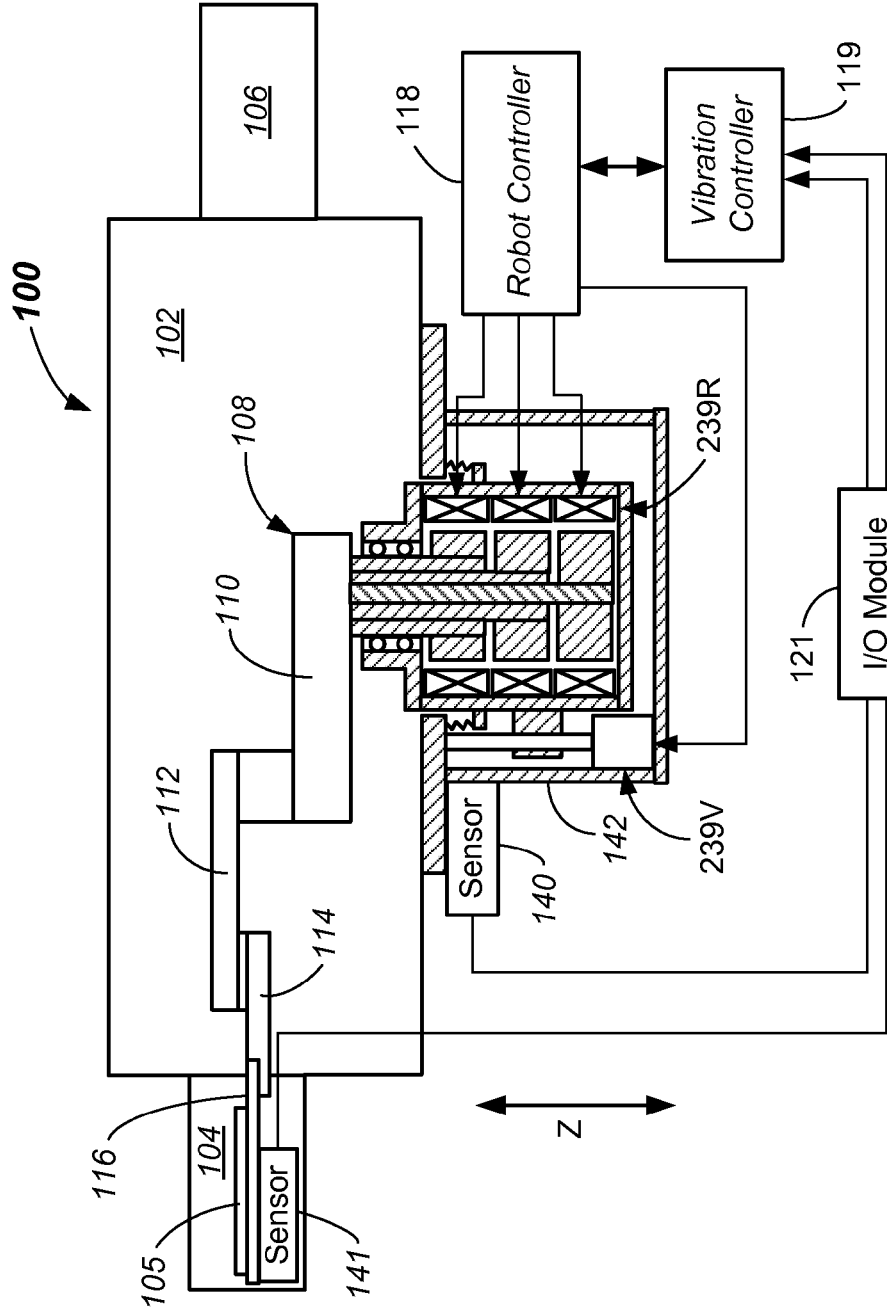
FIG. 2 illustrates a partially cross-sectioned side view of the vibration-controlled substrate transport system of FIG. 1 according to embodiments.
Figure 3:
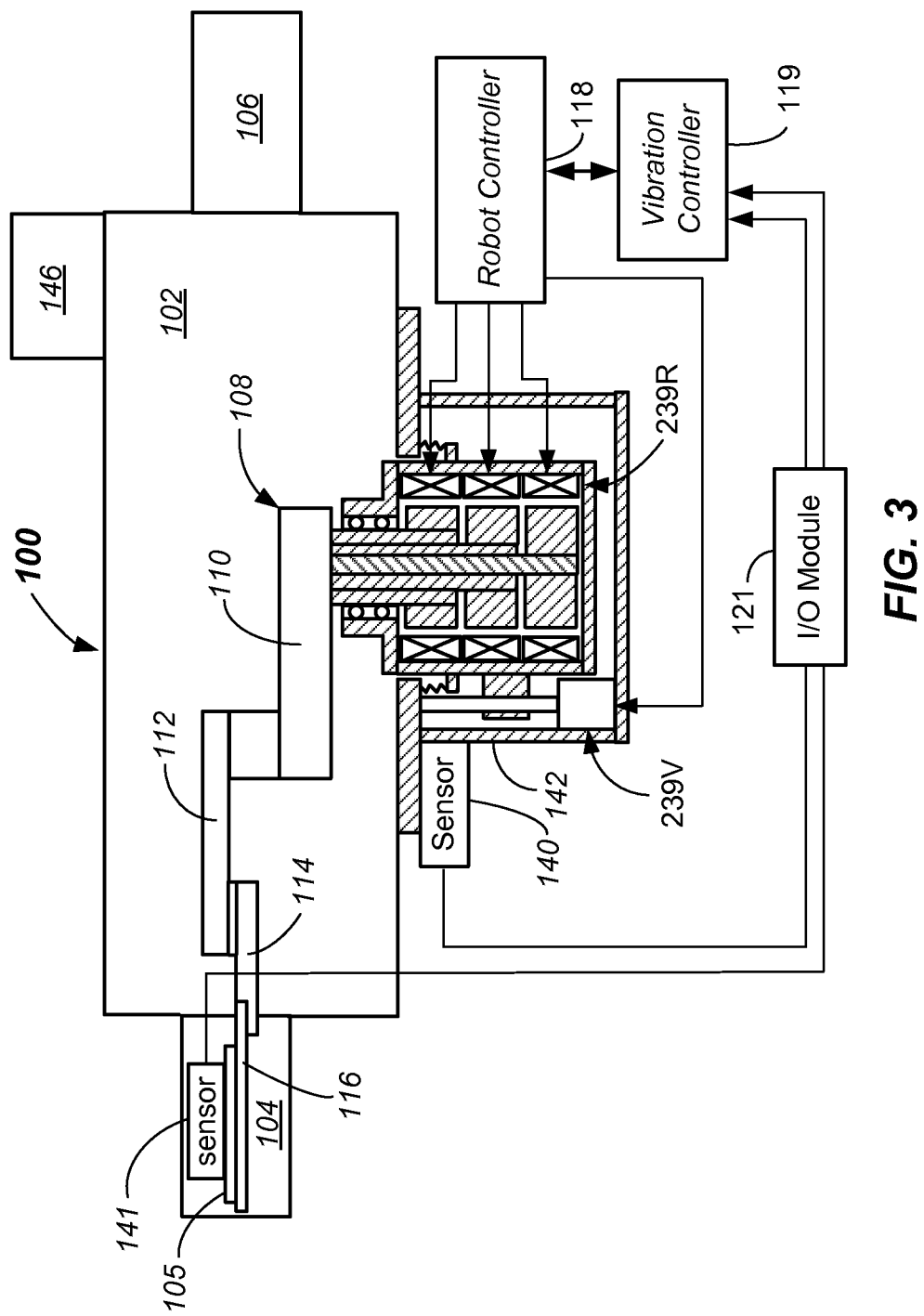
FIG. 3 illustrates another partially cross-sectioned side view of a vibration-controlled substrate transport system according to embodiments.

Referring now to FIGS. 2-3, schematic side view diagrams of several example embodiments of a vibration-controlled substrate transportation system 100 are shown. The robot 108, may include an upper arm 110, forearm 112, and wrist member 114, and is shown in a fully-extended orientation servicing a process chamber 104 by inserting the end effector 116 (the same as described within reference to FIG. 1) into the process chamber 104 such that the substrate 105 may be lifted off from the end effector 116 by lift pins or another suitable platform mechanism (not shown). Optionally, the put (placement of the substrate) or pick (removal of the substrate) within the chamber (104 or 106) may be accomplished by a z-axis functionality of the robot 108 whereby the robot 108 has the capability of lowering and raising the end effector 116 in the Z-axis (e.g., vertically) to accomplish the put or pick. The operation of one or more rotational motors 239R or vertical motors 239V that control the motion (operation and orientation) of the robot 108, are controlled via a robot controller 118. Robot controller 118 may include a suitable drive circuit and may include one or more filters, as will be described herein below.

Vibration of the end effector 116, and therefore the substrate 105, may occur along all three axes (X, Y and Z). However, the vibration along the Z-axis (vertical axis) may be the most problematic in that vibration along the Z-axis may lead to a corresponding reduction in a normal force between the substrate 105 and the end effector 116 and a corresponding reduction in the friction force between the substrate 105 and the end effector 116. This may, in turn, lead to more sliding of the substrate 105 on the end effector 116, and therefore more particle generation.

The vibration created along the Z-axis may often be the result of structural excitation of the robot 108, such as, for example, excitation from movement of the motors 239R controlling the rotation of the robot arms 110, 112, 114 and the end effector 116 along the X and Y axes. As such, it may be difficult to directly minimize vibration along the Z axis. To that end, one or more embodiments of the invention may provide for indirectly minimizing the vibration along the Z axis by adjusting a motion of the robot 108, or robot mechanism, along the X and Y axes, as will be further discussed below. In other aspects, vertical vibration caused by the vertical motor 239V may be addressed according to one or more embodiments.

The vibration-controlled substrate transport system 100 may include one or more sensors 140, 141 operable to sense vibration as the robot 108 transports the substrate 105 along its motion profile (e.g., motion transfer path). The one or more sensors 140, 141 may be accelerometers. In some embodiments, the one or more sensor 140, 141 micro-electromechanical system (MEMS) accelerometers. As is well known, an accelerometer is a device that measures the vibration or acceleration during motion of a structure. Herein, the terms "vibration" and "acceleration" will be used interchangeably.

In some embodiments, the one or more sensors 140, 141 may be coupled or mounted to the robot 108 via at least one of a magnet, an adhesive, and a mounting stud, or any other suitable mounting means. For example, at least one sensor 140 may be mounted directly to a robot housing 142. The sensor 140 may transmit a signal of the sensed vibration to a vibration controller 119 for storage and analysis of the sensed vibration, as will be further described below. As described above, conventional systems may use one or more position encoders to determine movement of the motors 239R, 239V and thus the motion of the various robot arms and of the substrate 105 on the end effector 116. While the movement may suggest vibration, it does not definitively mean vibration has occurred, nor can a magnitude or frequency of the vibration be determined from the position encoders.

In some embodiments, it may be challenging to route a wire carrying a signal into a chamber that may be under a vacuum, such as in the transfer chamber 102, for example. However, vibration at the housing 142 may be reliably measurable. By including the sensor 140 (e.g., a permanent sensor) at the robot housing 142, embodiments of the present invention may provide for sensing the vibration at a remote location outside of the chamber 102. Vibration of the robot 108 may be detected with the sensors (e.g., sensors 140, 141) as the robot 108 transports the substrate 105, thus vibration information may be attained remotely from sensor 140 and on the end effector 116 or substrate 105 from sensor 141 (e.g., a temporary sensor). This vibration information from the sensors 140, 141 may be used to generate a vibration model to predict vibration of the substrate 105 on the end effector 116 for any particular motion or system input. In particular, the vibration information from the sensors 140, 141 may be used to develop a transfer function describing the relationship between vibration at sensor 140 and vibration at sensor 141. The transfer function can be found by analyzing the data in the frequency domain and performing a curve fit, for example. This relationship may further be dependent on the position of the robot 108, and in this case, a "family" of transfer functions, one for each position of the robot 108 of interest may be generated.

In embodiments, the one or more sensors 140, 141 may transmit the sensed vibration signals to an I/O module 121, for example. The signals may be a vertical acceleration signal along the Z-axis, but other directional accelerations may be sensed as well. I/O module 121 may convert the signals into digital data that may be processed digitally. I/O module 121 may include suitable A/D converters and amplifiers, if needed.

The converted digital data is then transmitted to the vibration controller 119, where it may be collected in real-time and stored in memory for a number of applicable purposes. For example, the stored or collected data may be used for control purposes to generate a vibration model, minimize vibration of the end effector 116 during the carrying out of substrate motion profiles, delay or modify transfers when certain input vibration is sensed at sensor 140, for diagnostic purposes, or other suitable purposes.

In one aspect, the sensor 140 may sense, and the vibration controller 119 may record, the vibrations occurring at the robot housing 142 during a given amount of time during the motion profile or operation of other system devices and/or at any physical point in a transfer motion profile. Likewise, sensor 141 may sense, and the vibration controller 119 may record, the vibrations occurring at the end effector or on the substrate 105. In this way, a correlation (e.g., a model) between vibration at the housing 142 and vibration at the end effector 116 or on the substrate 105 may be determined.

The total vibration is equal to the sum of the acceleration that is due to carrying out the motion profile that is normal, and the undesired acceleration (e.g., z-axis vibration) due to vibration of the end effector 116. In some embodiments, it may be desirable to have a total vibration magnitude in the X-Y plane that is limited to be less than about 0.1 g of acceleration, assuming a −1 g acceleration acting in the vertical (Z) direction. However, if there is vibration in Z direction, an acceleration limit in X-Y plane may be less. In other words, the permissible X-Y acceleration is a function of the friction between end effector 116 and the substrate 105, which is itself a function of acceleration in the Z direction. It is desirable to minimize vertical vibration so that the end effector 116 may be moved in the horizontal plane (X-Y plane) at the fastest rate possible.

The stored data may then be used during future normal system operation to predict the acceleration or vibration of the substrate 105 on the end effector 116 (e.g., in a vertical Z direction).

In some embodiments, control signals to the motors 239R, 239V may be used to modify the motion profile at times to reduce vibration. Additionally, if a system failure has happened, it may be desirable to determine the vibration at the time of failure in an effort to avoid future failures. The failure data may be used to modify robot motions to avoid future failures or to initiate (e.g., flag or alarm) maintenance actions, or even stop the robot 108.

As discussed, the previously-collected vibrational and motion data may also be used to create a model (e.g., one or more transfer functions) of the different robot motions carried out by the motors 239R, 239V in relation to the vertical vibration occurring at the end effector 116 or substrate 105 under these motions. These one or more transfer functions may be used to determine acceleration at the end effector 116 and of the substrate 105 based upon vibration measured by sensor 140. Sensor 141 may be removed from the operating system and may only be used to generate the model. In some embodiments, a filter design may be applied to prevent control inputs that cause robot structure vibrations at a frequency or frequencies that result in an undesirable total vibration of the end effector 116 and/or the substrate 105 in the vertical direction (Z direction).

Figure 4A:
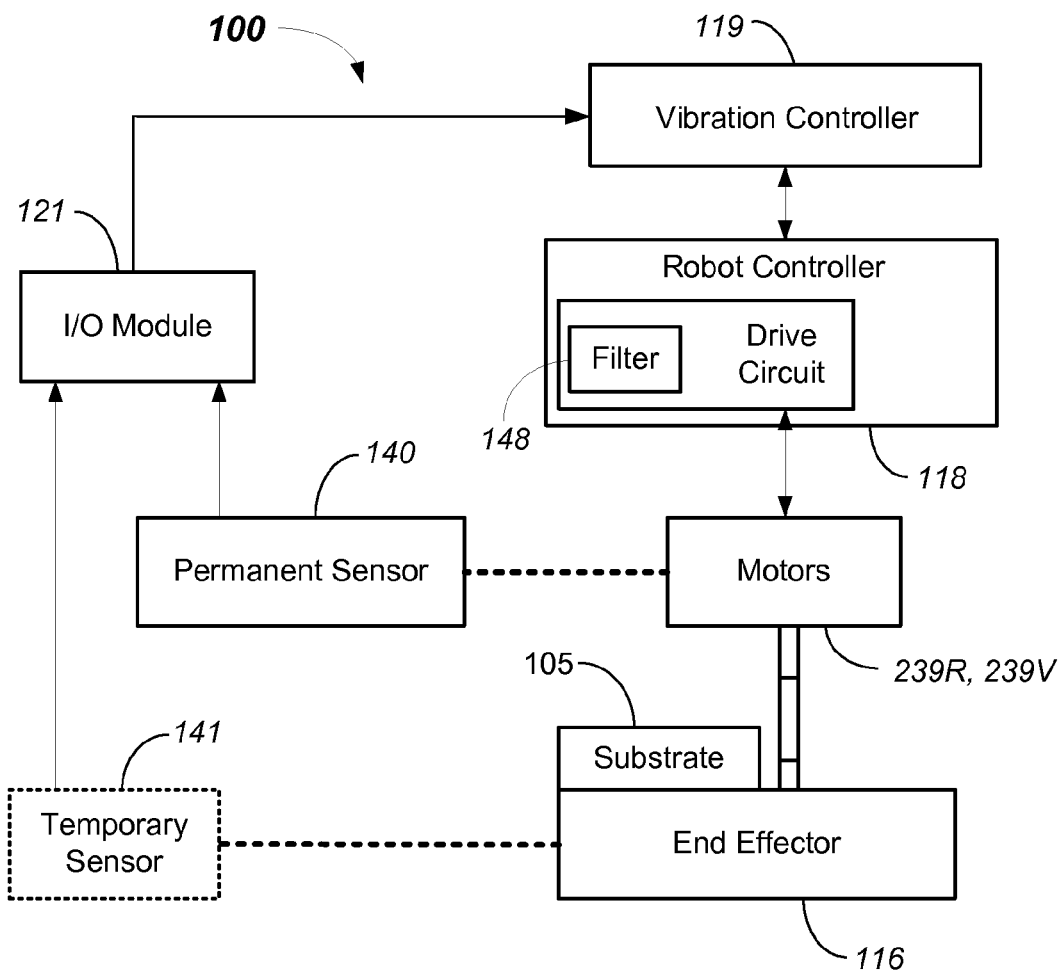
FIG. 4A illustrates a block diagram of a vibration-controlled substrate transport system according to embodiments.
Figure 4B:
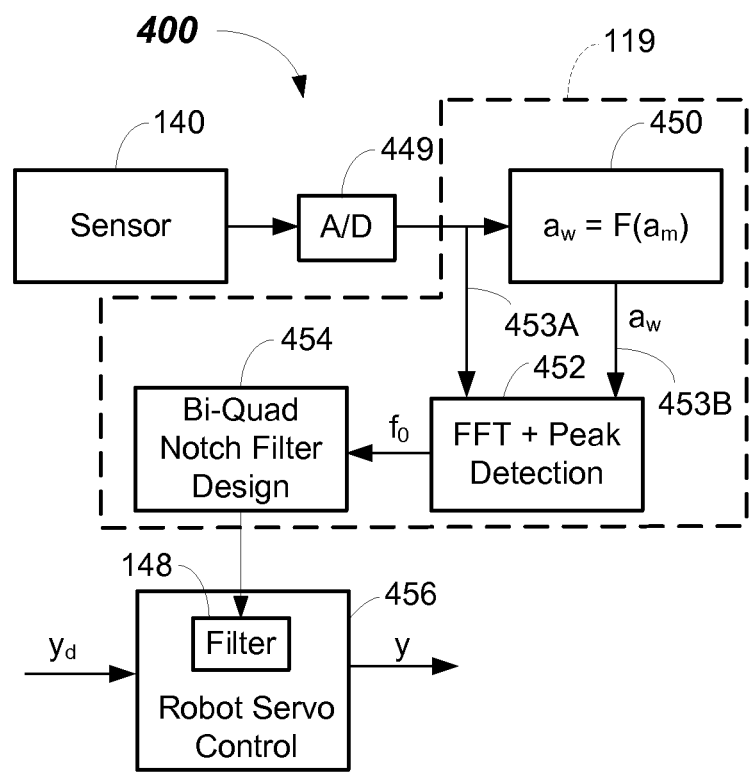
FIG. 4B illustrates a block diagram of a vibration control model of the system according to embodiments.

For example, as shown in FIG. 4B, a filter 148, such as a bi-quad notch filter, may be applied to the servo inputs from the robot controller 119 carrying out robot servo control driving the rotational motors 239R and vertical motor 239V that cause the various motions of the robot 108.

Figure 5:
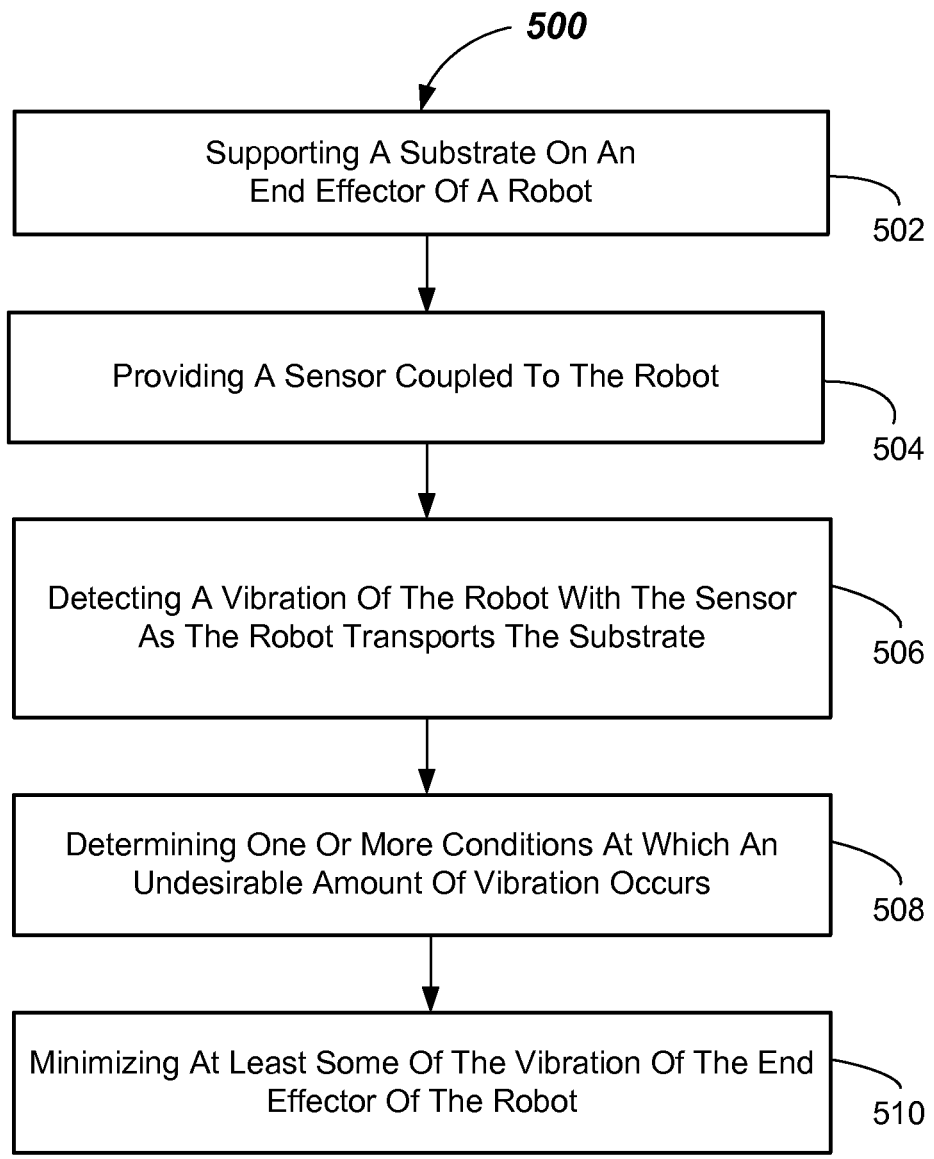
FIG. 5 illustrates a flowchart depicting a robot vibration reduction method according to embodiments.

The detailed operation of a vibration-controlled robot apparatus will now be described in more detail with reference to FIGS. 1-4B, and the flowchart in FIG. 5 illustrating a method 500 of operating a vibration-controlled robot apparatus according to one or more embodiments. The method 500 includes supporting a substrate (e.g., substrate 105) on an end effector (e.g., end effector 116) a robot (e.g., robot 108) in 502. In particular, the end effector 116 of the robot 108 supports the substrate 105 during substrate transfer between various chambers 104, 106 (e.g., process chamber to process chamber, process chamber to load lock chamber, or vice versa). Any suitable robot may be used, such as a multi-arm robot 108 described herein. Further, the robot 108 may be used to support items other than substrates 105, and may be used in other systems.

The method 500 may include providing a sensor (e.g., sensor 140, sensor 141, or both) coupled to the robot 108 in 504. Coupling to the robot 108 may be through coupling through the housing 142, through one or more of the motors 239R, 239V, to a structure the robot 108 is attached to, to a test substrate 105, or to other the components of the robot 108, such as to the end effector 116. In some embodiments, a plurality of sensors 140, 141 may be coupled directly to the robot 108. In some embodiments, only sensor 140 may be used. In 506, the method includes detecting vibration of the robot 108 with the sensor (e.g., sensor 140, sensor 141, or both) as the robot 108 transports the substrate 105 in 506. In embodiments, the detected vibration data may be collected from a permanent sensor 140 positioned on the robot housing 142, where the permanent sensor 140 senses the vibration. As described above, it may be difficult to route signals in a vacuum environment, such as in the transfer chamber 102. Since the robot housing 142 is outside the vacuum of the transfer chamber 102, a permanent sensor 140 positioned on the robot housing 142 or a structure to which the robot 108 is mounted may provide reliable and consistently measurable data regarding the vibration.

In other embodiments a combination of the permanent sensor 140 positioned on the robot housing 142 and a temporary sensor 141 positioned on the end effector 116 (FIG. 2) and/or on a test substrate 105 (FIG. 3) may be used to generate vibration data (e.g., vertical vibration data). The permanent sensor 140 may more directly sense the vibration of the motors 239R, 239V used to operate the robot 108, as opposed to the temporary sensor 141 which may directly sense the vibration of the end effector 116 or substrate 105 due to the vibration of the motors 239R, 239V or other system components. While the data from the permanent sensor 140 may be more reliably and conveniently transmitted, as the permanent sensor 140 is outside a vacuum, using data from the combination of both the permanent sensor 140 and the temporary sensor 141 may provide a more reliable indication of the substrate 105 vibration, as the temporary sensor 141 is directly sensing the vibration of the end effector 116 the substrate 105 is supported by, and in some instances the actual substrate 105. In embodiments, where the sensor 141 may be located at or near the end effector 116, direct vibration measurements may be achieved. However, in many embodiments, only a sensor 140 coupled to the housing 142 or elsewhere on the structure supporting the robot 108 may be provided.

In some embodiments, to collect vibration data for diagnostic, modeling, or other future use, external vibration may be artificially induced, such as with an actuating device such as a vibrating mass 146 (FIG. 3) attached to the transfer chamber 102, for example. Other vibration inducing devices may be used. In other embodiments, instead of artificially inducing external vibration, it may be possible to collect data from vibrations created during non-test/production operations of the system 100, as these operations may continue while using a temporary sensor 141 on the end effector 116 or the test substrate 105.

In other embodiments, sensors 140 and 141 may be used to generate correlation data. For example, an update or recalibration routine may be run while the permanent sensor 140 and the temporary sensor 141 are sensing vibrations and collecting data. In other embodiments, instead of artificially inducing external vibration such as with vibrating mass 146, the robot 108 may itself be forced to vibrate by introducing vibration "noise" of one or more frequencies into the servo drive output signals that drive the respective motors 239R, 239V. Specifically, white noise (e.g., a random signal that includes all excitation frequencies) may be injected into the commanded drive signal (e.g., a commanded current signal)

through a feedforward path in the drive circuit of the robot controller 118 (e.g., a servo controller).

As shown in FIG. 4A, during the data collection process, the signals from either or both the permanent sensor 140 and the temporary sensor 141 may be sampled and transmitted to the I/O module 121 for signal conversion to a digital data format. The converted digital data may then be transmitted to the vibration controller 119. The vibration controller 119 may perform general high level processing and may further process the data from the sensors 140, 141. The vibration controller 119 may also interface with the robot controller 118, and receive feedback from the robot controller 118. The vibration controller 119 may be functional to "design" an optimal filter via selecting filter coefficients for the filter (e.g., the bi-quad filter) and sending the coefficients to the robot controller 118 for implementation. This can be performed at some predetermined update rate.

In embodiments where the data is sampled from both the permanent sensor 140 and the temporary sensor 141, the vibration controller 119 may include logic to compute a transfer function of a model that correlates the data from the permanent sensor 140 with the data from the temporary sensor 141. The data may be generated for various inputs from the rotational motors 239R, vertical motor 239V, or both, and also for external vibration inputs, such as from the vibrating mass 146 or other close-by equipment. Thereafter, the sensed data may be used to model the actual substrate vibration so that vibration inputs due to external vibration or motor inputs may be sensed at the motor housing 142, for example, and used to anticipate resulting vibration of the end effector 116 and substrate 105. In this manner, only a sensor outside of the chamber 102 may be used, and yet vibration may be precisely predicted.

Again referring to FIG. 5, in 508, the vibration controller 119 may include logic to analyze the collected data, and in some instances correlate the data. The analysis may include, for example, determining when, and under what conditions, the total vibration may reach an undesirable level (e.g., greater than 0.1 g of lateral acceleration). Further, the analysis may determine what inputs to the robot 108 caused motions associated with that undesirable vibration level.

The collected data and analysis may be stored, for example, in any suitable storage medium (e.g. RAM, ROM or other memory of the vibration controller 119). This stored analysis and data may be used to create a substrate vibration model (e.g., a transfer function). The vibration model may be used to decrease vibration during future operations by preventing the vibration creating elements (e.g. internal tool stimulators such as rotational motors 239R, vertical motors 239V, pumps, slit valves, other robots, external stimulation, sub-optimal servo control, or combinations thereof) from operating at magnitudes or at a particular frequency or frequencies, as described below.

Additionally, or alternatively, during real-time operation of the robot 108, the permanent sensor 140 may sense vibration of the robot 108 external to the chamber 102, and the vibration controller 119 may compare this sensed data to the stored data and analysis such that an operational parameters of the vibration creating elements (e.g., motors 239R, 239V) may be adjusted in real-time to avoid operation at a particular frequency of frequencies that causes undesirable vibration, thereby reducing vibration of the robot 108 and the supported substrate 105. Adjustment of the operation of the robot 108 to prevent the vibration creating elements from operating at a particular frequency may occur manually or automatically.

After the data is analyzed, in some embodiments a filter 148 or other destructive interference may be applied to the robot 108 via the robot controller 118, for example, to reduce the amplitude of the vibration, as shown in FIG. 4A. In some embodiments, the one or more filters 148 may be a notch filter, and in particular a bi-quad notch filter, for example. As is conventionally known, a notch filter is a filter that passes all frequencies except those in a stop band. The filter 148 may be fully digitally implemented. The frequencies in the stop band are the frequencies that are prevented from being transmitted. The notch filter 148 may be adjusted by setting coefficients thereof. For example, the stop band may be set, as well as the sharpness of the edges of the notch filter 148 (the so-called "Q" of the filter).

The notch filter 148 may function to prevent the motor 239R and/or motor 239V or other vibration-creating elements, from operating at a particular frequency or frequencies causing heightened vibration at the substrate 105, thereby reducing the vibration of the robot 108 and at the substrate 105. For example, the filter 148 may be coupled to or part of the motor drive circuit adapted to generate a drive signal to the motors 239R, 239V (e.g., a servo control system). The filter 148 may be purely digital, so there may be no discrete components. The vibration controller 119 may function to set one or more coefficients of one or more (e.g., multiple) filters that are provided within the servo control loop of the robot controller 118. Controlling how these coefficients are set determines how the one or more filters 148 will behave, and may adjust the pass frequency and/or sharpness.

As shown in FIG. 4B, a control model 400 is shown. The sensor signal from the sensor 140 is converted to a digital signal by the A/D converter 449 and may be processed by a processor of the vibration controller 119 (shown dotted). The processor carries out a calculation of an estimate of the vibration $a_w$ at the end effector 116 based on the model in block 450 and the measured value $a_m$. A Fourier transform and peak detection routines may be carried out in block 452 to determine a frequency $f_w$ and peak amplitude of the signals in lines 453A, 453B, respectively. From these values, coefficients for the one or more filters 148 may be determined by bi-quad notch filter design block 454. The various filter coefficients may be chosen by a process described below having one or more inputs such as Q, $f_0$, and $f_s$, where Q is a factor determining how aggressively the vibration is to be cancelled, $f_0$ is the vibration frequency, and $f_s$ is the sampling frequency. The generic bi-quad filter then may take the form of:

$$Y_n = (b_0/a_0)X_n + (b_1/a_0)X_{n-1} + (b_2/a_0)X_{n-2} - (a_1/a_0)y_{n-1} - (a_2/a_0)y_{n-2}$$

and $$\alpha = \sin(\omega_0)/2Q$$

and $$\omega_0 = 2\pi f_0/f_s$$

The coefficients can then be calculated as:

$$b_0 = 1$$

$$b_1 = -2\cos(\omega_o)$$

$$b_2 = 1$$

$$a_0 = 1 + \alpha$$

$$a_1 = -2\cos(\omega_o)$$

$$a_2 = 1 - \alpha$$

The one or more filters 148 having coefficients set by the bi-quad notch filter design block 454 as described above may be used to modify the drive signal from the robot servo control 456 of the robot controller 119 such that the drive signal yd is modified to drive the motors 239R, 239V with drive signal y. The modified drive signal y is appropriately filtered by the one or more filters 148 so that vibration at the end effector 116 is minimized at certain frequencies.

In some embodiments multiple filters may be used in parallel, at the same time such that multiple frequencies may be filtered in cases where multiple frequencies produce unwanted vertical vibration at the end effector 116. In the case of multiple disturbances or undesirable vibrations occurring at the same time, the robot controller 118 may employ a primary dominant effect whereby the more undesirable vibration is filtered, or prevented from occurring, first.

In some embodiments, after the data is analyzed, in addition to, or instead of, the filter 148 being applied, the operation of the robot 108 may be further adjusted to minimize the vibration. For example, as discussed above, vibration of the end effector 116 and the substrate 105 along the z-axis may be cross-mode coupled and due to motion of the end effector 116 along the x-axis and the y-axis. Therefore, to minimize the vibration of the end effector 116 along the z-axis, the operation of one or more of the rotational motors 239R controlling the movement of the end effector 116 along the x-axis and y-axis may be adjusted or modified, such that the motors 239R do not operate in a manner that creates vibrations. For example, motions at certain undesirable frequencies that excite vertical vibration modes of the end effector 116 may be avoided or minimized, such as by using the filters.

While embodiments of the invention are susceptible to various modifications and alternative forms, specific embodiments and methods thereof have been shown by way of example in the drawings and are described in detail herein. It should be understood, however, that it is not intended to limit the invention to the particular apparatus, systems, or methods disclosed, but, to the contrary, the intention is to cover all modifications, equivalents, and alternatives falling within the scope of the invention.

The invention claimed is:

1. A vibration-controlled robot apparatus, comprising:
   a robot having a housing coupleable to a structure, and an end effector operable to transport a substrate;
   a permanent sensor coupled to the housing of the robot or the structure supporting the housing, the permanent sensor operable to sense vibration as the robot transports the substrate; and
   a vibration controller including:
   a model generated from input from the permanent sensor and a temporary sensor coupled to the end effector or the substrate, the model adapted to estimate vibration at the substrate based on vibration sensed by the permanent sensor, and
   a drive circuit for a drive motor of the robot, the drive circuit operable for reducing vibration of the robot by filtering drive signals through a filter to the drive motor based upon data measured by the permanent sensor.

2. The vibration-controlled robot apparatus of claim 1 wherein the permanent sensor is a micro-electromechanical system (MEMS) accelerometer.

3. The vibration-controlled robot apparatus of claim 2 wherein the MEMS accelerometer is mounted to the robot via at least one of a magnet, an adhesive, and a mounting stud.

4. The vibration-controlled robot apparatus of claim 1 comprising the filter operable to the filter certain input frequencies to the robot, the filter including coefficients set based on input from the permanent sensor.

5. The vibration-controlled robot apparatus of claim 4 wherein the filter comprises a bi-quad notch filter that is operational to reduce vibration by preventing vibration at a pre-set frequency from being communicated to the substrate.

6. The vibration-controlled robot apparatus of claim 4 wherein the total permissible vibration is less than 0.1 g of acceleration.

7. The vibration-controlled robot apparatus of claim 1 further comprising a vibration controller operable to receive a first signal from the permanent sensor indicative of the vibration.

8. The vibration-controlled robot apparatus of claim 7 wherein the vibration controller comprises logic to correlate sensed vibration with particular motions of the robot.

9. The vibration-controlled robot apparatus of claim 8 wherein the logic compares the first signal to a database to determine expected vibration.

10. The vibration-controlled robot apparatus of claim 9 wherein the logic compares the first signal to a database to determine whether the acceleration of an end effector of the robot is undesirable.

11. A robot vibration reduction method, comprising:
    supporting a substrate with an end effector of a robot;
    providing a permanent sensor coupled to a housing of the robot or a structure supporting the housing;
    providing a temporary sensor coupled to the end effector or substrate;
    detecting a vibration with the permanent sensor and the temporary sensor as the robot being driven by a drive motor transports the substrate;
    generating a vibration model based on vibration detected by the permanent sensor and the temporary sensor to predict vibration of the substrate for any motion or system input;
    removing the temporary sensor;
    determining one or more conditions under which an undesirable amount of vibration occurs; and
    minimizing at least some of the vibration of the end effector of the robot by filtering drive signals to the drive motor at the one or more conditions as measured by the permanent sensor.

12. The method of claim 11, wherein minimizing at least some of the vibration of the robot comprises:
    applying a filter to a motor drive circuit to cut out one or more frequency at which the undesirable amount of vibration occurs.

13. The method of claim 12 wherein the filter is a bi-quad notch filter.

14. The method of claim 11, wherein minimizing at least some of the vibration of the robot comprises:
    preventing the robot from operating at the frequency at which the undesirable amount of vibration occurs.

15. The method of claim 11 wherein determining a frequency at which an undesirable amount of vibration occurs comprises:
    artificially inducing external vibration with a vibrating mass.

16. A vibration-controlled substrate transport system, comprising:
    a chamber;
    a robot received in the chamber, the robot having a housing and an end effector operable to transport a substrate;

a permanent sensor coupled to the housing of the robot or a structure supporting the housing, the permanent sensor operable to detect vibration of the robot as the robot supports the substrate; and a vibration controller including:

a vibration model based on vibration detected by the permanent sensor and temporary sensor coupled to the end effector or the substrate, the model adapted to predict vibration of the substrate of the end effector for any motion or system input, and a drive circuit for a drive motor, the drive circuit having a filter operable to reduce vibration of the end effector based on the vibration detected by the permanent sensor.

17. The system of claim 16 wherein the sensor is a microelectromechanical system (MEMS) accelerometer.

18. The system of claims 16 wherein the filter is a bi-quad notch filter.

19. The system of claim 18 wherein the bi-quad notch filter reduces vibration at the end effector by preventing vibration at a pre-set frequency from being communicated to the end effector.

* * * * *